(12) United States Patent
Takaaki

(10) Patent No.: US 7,706,068 B2
(45) Date of Patent: Apr. 27, 2010

(54) IMAGE THREE-DIMENSIONAL RECOGNITION APPARATUS

(76) Inventor: Ito Takaaki, 3-12-16, Higashijonan, Oyama-shi, Tochigi, 323-0829 (JP)

( * ) Notice: Subject to any disclaimer, the term of this patent is extended or adjusted under 35 U.S.C. 154(b) by 0 days.

(21) Appl. No.: 12/490,439

(22) Filed: Jun. 24, 2009

(65) Prior Publication Data

US 2009/0323183 A1 Dec. 31, 2009

(30) Foreign Application Priority Data

Jun. 25, 2008 (JP) .............................. 2008-166170

(51) Int. Cl.
*G02B 27/24* (2006.01)
(52) U.S. Cl. ................ 359/471; 359/479; 359/856; 359/857
(58) Field of Classification Search ............ 359/471, 359/478, 479, 850, 855, 856, 857; 353/10
See application file for complete search history.

(56) References Cited

U.S. PATENT DOCUMENTS 5,130,856 A * 7/1992 Tichenor et al. ............ 359/857
5,200,859 A * 4/1993 Payner et al. ............... 359/857

FOREIGN PATENT DOCUMENTS

| JP | 10-96865 | 4/1989 |
| JP | U06-69929 | 9/1994 |
| JP | 08-186849 | 7/1996 |

OTHER PUBLICATIONS

Takanori Okoshi, "Three-Dimensional Image Engineering", Japan, Asakura-Syoin, Jul. 10, 1991, p. 36-41.

* cited by examiner

*Primary Examiner*—Alessandro Amari
(74) *Attorney, Agent, or Firm*—The Law Office of Michael E. Kondoudis

(57) ABSTRACT

The image three-dimensional recognition apparatus is an apparatus for making it possible for an observer to recognize a planar image as a three-dimensional image, and has a first mirror, a second mirror and a mirror fixing part. The mirrors have the mirror planes, respectively. The mirror fixing part fixes the mirrors, and has a base and two support members arranged on the base. The mirrors are fixed at a position sandwiched between the support members by attaching the side faces of the mirrors to the support members. The first mirror is located directly below the second mirror. The mirror plane of the second mirror is directed toward the planar image displayed in a screen of a display device, and is inclined obliquely downward. The mirror plane of the first mirror is directed toward the observer and is inclined obliquely upward.

8 Claims, 6 Drawing Sheets

FIG. 3
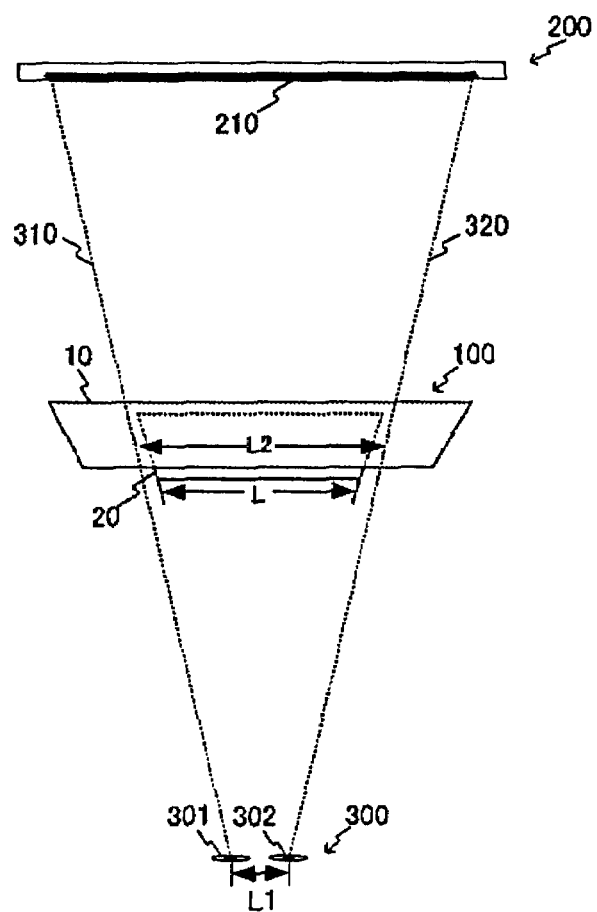
(a)
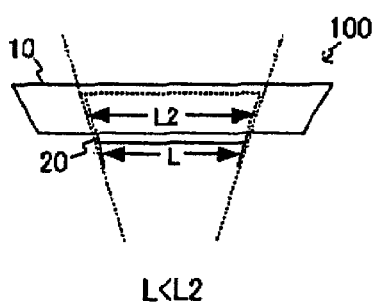
L<L2
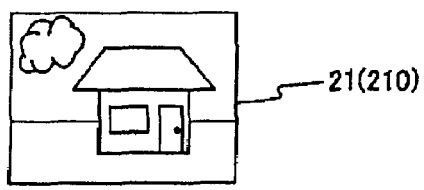
(b)
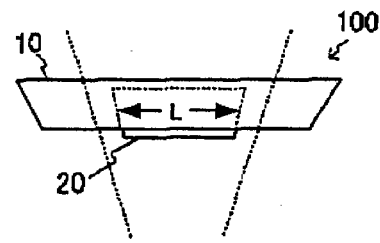
L is made shorter.
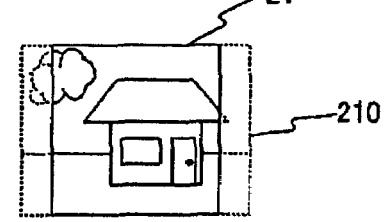
(c)

IMAGE THREE-DIMENSIONAL RECOGNITION APPARATUS

CROSS REFERENCE TO RELATED APPLICATION

This application claims the benefit of Japanese Patent Application No. 2008-166170 filed Jun. 25, 2008, now issued as Japanese Patent No. 4222627.

BACKGROUND OF THE INVENTION

1. Field of the Invention

The present invention relates to an image three-dimensional recognition apparatus for making it possible for an observer to recognize a planar image as a three-dimensional image, and especially relates to an image three-dimensional recognition apparatus with a simple structure.

2. Description of the Related Art

Conventionally, as a way of making it possible for an observer to recognize a planar image as a three-dimensional image, the way using binocular parallax is known. Further, as an apparatus for making it possible for an observer to recognize a planar image as a three-dimensional image on the basis of binocular parallax, a three-dimensional vision apparatus is proposed, in which an image for the left eye and an image for the right eye are projected on the rear face of a screen by projectors so as to be arranged alternately in the vertical direction in the form of a stripe, and an observer can see the image for the left eye with his/her left eye and the image for the right eye with his/her right eye, through an optical member arranged in front of the screen, so that the observer can see a three-dimensional image without a polarization glasses.

In the three-dimensional vision apparatus, polarization members are arranged on the rear side of the screen in the form of a stripe. The pitch of the polarization members are set so as to match the pitch of the stripe formed of the arrangement of the images. The polarization direction of each polarization member is orthogonal to the polarization direction of the adjacent polarization member. Projection light for the left eye and projection light for the right eye, each having the polarization direction coincident with the polarization direction of the corresponding polarization member, are projected by the projectors (see patent document 1).

[Patent Document 1] Publication of Japanese Patent Application No. 08-186849 (FIG. 1)

However, the above-described three-dimensional vision apparatus needs to have the two projectors and the polarization members, and therefore is complex in constitution. Further, the three-dimensional vision apparatus needs to have the two projectors and the polarization members, and therefore is expensive in production cost of the apparatus.

SUMMARY OF THE INVENTION

It is therefore an object of the present invention to provide an image three-dimensional recognition apparatus that makes it possible for an observer to recognize a planar image as a three-dimensional image and has a simple structure.

To achieve the above-described object, an image three-dimensional recognition apparatus according to one aspect of the present invention is an apparatus for making it possible for an observer existing at a particular distance away from the image three-dimensional recognition apparatus to recognize a planar image displayed in an image output device for displaying an image, as a three-dimensional image, comprising: a first mirror that has a width in a horizontal direction of not less than approximately 6.5 centimeter and not more than a distance from a right-eye-right-edge line connecting between the right eye of the observer and a right edge of the image output device to a left-eye-left-edge line connecting between the left eye of the observer and a left edge of the image output device; a second mirror that has a width in the horizontal direction of not less than the width in the horizontal direction of the first mirror; and a mirror fixing part for fixing the first mirror and the second mirror, wherein the second mirror is fixed to the mirror fixing part in such a manner that a second mirror plane, which is a mirror plane of the second mirror, is directed toward the planar image and is inclined obliquely downward, and the first mirror is fixed to the mirror fixing part in such a manner that a part or the whole of an image reflected in the second mirror plane is reflected in a first mirror plane, which is a mirror plane of the first mirror, and the first mirror plane is inclined obliquely upward. By using this image three-dimensional recognition apparatus, the observer can recognize a planar image as a three-dimensional image.

In the image three-dimensional recognition apparatus, it is preferable that the mirror fixing part has a base and two support members arranged on the base, the first mirror is fixed to the support members by attaching both of side faces of the first mirror to the support members, and the second mirror is fixed to the support members by attaching both of side faces of the second mirror to the support members. In this image three-dimensional recognition apparatus, the first mirror and the second mirror can be fixed by the simple structure.

To the image three-dimensional recognition apparatus, a first angle changing part for changing an angle at which the first mirror plane is inclined obliquely upward may be added. In this image three-dimensional recognition apparatus, the angle of the first mirror can be changed.

To the image three-dimensional recognition apparatus, a second angle changing part for changing an angle at which the second mirror plane is inclined obliquely downward may be added. In this image three-dimensional recognition apparatus, the angle of the second mirror can be changed.

To achieve the above-described object, an image three-dimensional recognition apparatus according to another aspect of the present invention is an apparatus for making it possible for an observer existing at a particular distance away from the image three-dimensional recognition apparatus to recognize a planar image as a three-dimensional image, comprising: an image output part for displaying an image; a first mirror that has a width in a horizontal direction of not less than approximately 6.5 centimeter and not more than a distance from a right-eye-right-edge line connecting between the right eye of the observer and a right edge of the image output part to a left-eye-left-edge line connecting between the left eye of the observer and a left edge of the image output part; a second mirror that has a width in the horizontal direction of not less than the width in the horizontal direction of the first mirror; and a mirror fixing part for fixing the first mirror and the second mirror, wherein the second mirror is fixed to the mirror fixing part in such a manner that a second mirror plane, which is a mirror plane of the second mirror, is directed toward the planar image and is inclined obliquely downward, and the first mirror is fixed to the mirror fixing part in such a manner that a part or the whole of an image reflected in the second mirror plane is reflected in a first mirror plane, which is a mirror plane of the first mirror, and the first mirror plane is inclined obliquely upward. By using this image three-dimensional recognition apparatus, the observer can recognize a planar image as a three-dimensional image.

The present invention can exhibit an effect that an observer can recognize a planar image as a three-dimensional image.

BRIEF DESCRIPTION OF THE DRAWINGS

FIG. 3 is an explanatory diagram showing the widths and positions of mirrors of the image three-dimensional recognition apparatus;

DETAILED DESCRIPTION OF THE PREFERRED EMBODIMENTS

Embodiments of the present invention will be described with reference to the drawings.

Figure 1:
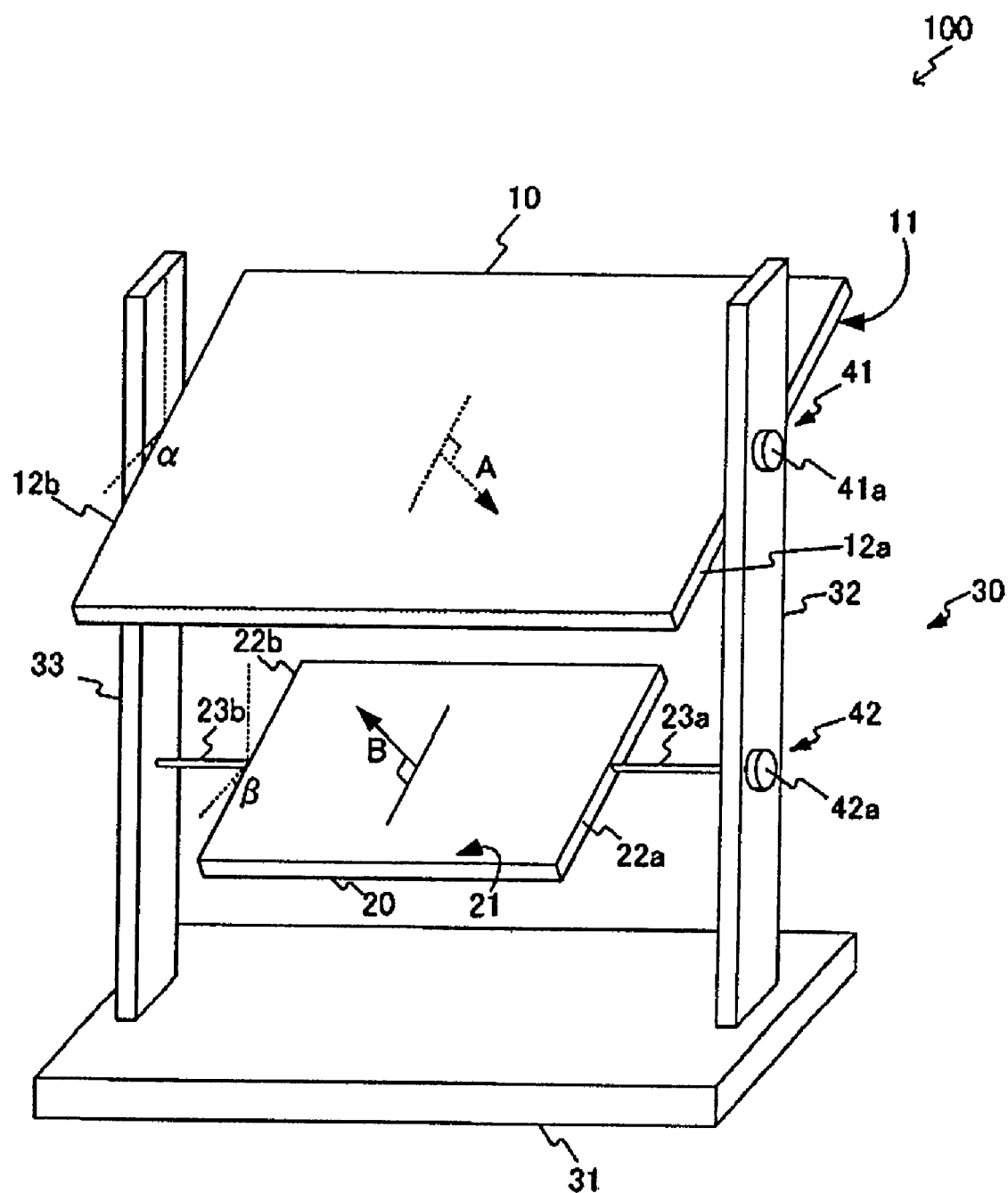
FIG. 1 is a perspective view showing an image three-dimensional recognition apparatus of an embodiment of the present invention.

FIG. 1 shows an image three-dimensional recognition apparatus 100 of an embodiment of the present invention. The three-dimensional recognition apparatus 100 is an apparatus for making it possible for an observer to recognize a planar image (a moving image or a still image) as a three-dimensional image, and has a mirror 10, a mirror 20 and a mirror fixing part 30.

The mirror 10 has a mirror plane 11, and the mirror 20 has a mirror plane 21. In FIG. 1, the mirror plane 11 is located on the rear side of the plane of the paper, and therefore cannot be seen. In the embodiment of the present invention, the width of the mirror 10 may be greater than the width of the mirror 20, in the horizontal direction. The details of the widths of the mirrors 10 and 20 will be described later. Hereafter, it is assumed that the width of the mirror 10 is greater than the width of the mirror 20, in the horizontal direction.

The mirror fixing part 30 is a part for fixing the mirror 10 and the mirror 20, and has, for instance, a base 31, a support member 32 and a support member 33. The support members 32 and 33 are arranged on the base 31 so as to rise from the base 31. The mirror 10 is fixed at a position sandwiched between the support member 32 and the support member 33 by attaching a side face 12a and a side face 12b of the mirror 10 to the support member 32 and the support member 33, respectively.

The mirror 10 is fixed to the support member 32 and the support member 33 at an angle of α (0°<α<90°) with respect to each of the support member 32 and the support member 33. Namely, the mirror 10 is fixed in such a manner that the mirror plane 11 of the mirror 10 is directed toward the back side of the paper and is inclined obliquely downward (for instance, in the direction indicated by arrow A). Further, the mirror 10 is fixed above the mirror 20.

Furthermore, an angle changing part 41 for changing the angle α of the mirror 10 with respect to the support member 32 and the support member 33 may be added to the image three-dimensional recognition apparatus 100. The angle changing part 41 may be provided with, for instance, a screw member (not shown in the figures) projecting from the center or a position near the center of the side face 12a of the mirror 10, a holes (not shown in the figures) formed in the support member 32, and a screw hole member 41a having a columnar member with a screw hole fitting the screw member. The constitution of the angle changing part 41 is not limited to this.

In the angle changing part 41 with the above-described constitution, a way of setting the angle α of the mirror 10 with respect to the support member 32 and the support member 33 at the angle α1 (0°<α1<90°) is as follows: moving the mirror 10 in such a manner that the angle α of the mirror 10 with respect to the support member 32 and the support member 33 coincides with α1; inserting the screw member into the hole formed in the support member 32 so as to make the screw member project from the support member 32; and screwing the screw hole member 41a to the screw member. By this way, the mirror 10 is fixed to the support member 32 and the support member 33 at the angle α1 with respect to the support member 32 and the support member 33.

The mirror 20 is fixed, similarly to the mirror 10, to a position sandwiched between the support member 32 and the support member 33 by attaching a side face 22a and a side face 22b of the mirror 20 to the support member 32 and the support member 33, respectively. The mirror plane 21 of the mirror 20 needs to be fixed at a position where a part or the whole of an image reflected in the mirror plane 11 of the mirror 10 is reflected in the mirror plane 21 of the mirror 20. The position directly below the mirror 10 is suitable for the position where a part or the whole of an image reflected in the mirror plane 11 of the mirror 10 is reflected in the mirror plane 21 of the mirror 20.

As descried above, the width of the mirror 20 is smaller than the width of the mirror 10, in the horizontal direction. Therefore, a fixation assisting member 23a and a fixation assisting member 23b need to be attached to the side face 22a and the side face 22b of the mirror 20 so as to project from the center or a position near the center of the side face 22a and the center or a position near the center of the side face 22b, respectively. In this case, the mirror 20 is fixed at a position sandwiched between the support member 32 and the support member 33 by attaching the fixation assisting member 23a and the fixation assisting member 23b to the support member 32 and the support member 33, respectively.

Further, the mirror 20 is fixed to the support member 32 and the support member 33 at an angle of β (0°<β<90°) with respect to the support member 32 and the support member 33. Namely, the mirror 20 is fixed in such a manner that the mirror plane 21 of the mirror 20 is directed toward the front side of the paper and is inclined obliquely upward (for instance, in the direction indicated by arrow B).

Furthermore, an angle changing part 42 for changing the angle β of the mirror 20 with respect to the support member 32 and the support member 33 may be added to the image three-dimensional recognition apparatus 100. A constitution similar to the above-described constitution of the angle changing part 41 may be applied to the angle changing part 42. The constitution of the angle changing part 42 is not limited to this.

In the angle changing part 42 with a constitution similar to the above-described constitution of the angle changing part 41, the end part of the fixation assisting part 23a is formed in the shape of a screw. This corresponds to the screw member in the angle changing part 41. Further, a hole (not shown in the figures) separate from the hole for the angle changing part 41 is formed in the support member 32.

In the angle changing part 42 with the above-described constitution, a way of setting the angle β of the mirror 20 with respect to the support member 32 and the support member 33 at the angle β1 (0°<β1<90°) is as follows: moving the mirror 20 in such a manner that the angle of the mirror 20 with respect to the support member 32 and the support member 33 coincides with β1; inserting the screw-shaped part of the fixation assisting part 23a into the hole formed in the support member 32 separately from the hole for the angle changing part 41, so as to make the screw-shaped part project from the support member 32.

After this, the screw hole member 42a having a constitution similar to the constitution of the screw hole member 41a is screwed to the screw-shaped part of the fixation assisting part 23a. By this way, the mirror 20 is fixed to the support member 32 and the support member 33 at the angle β1 with respect to the support member 32 and the support member 33.

Figure 2:
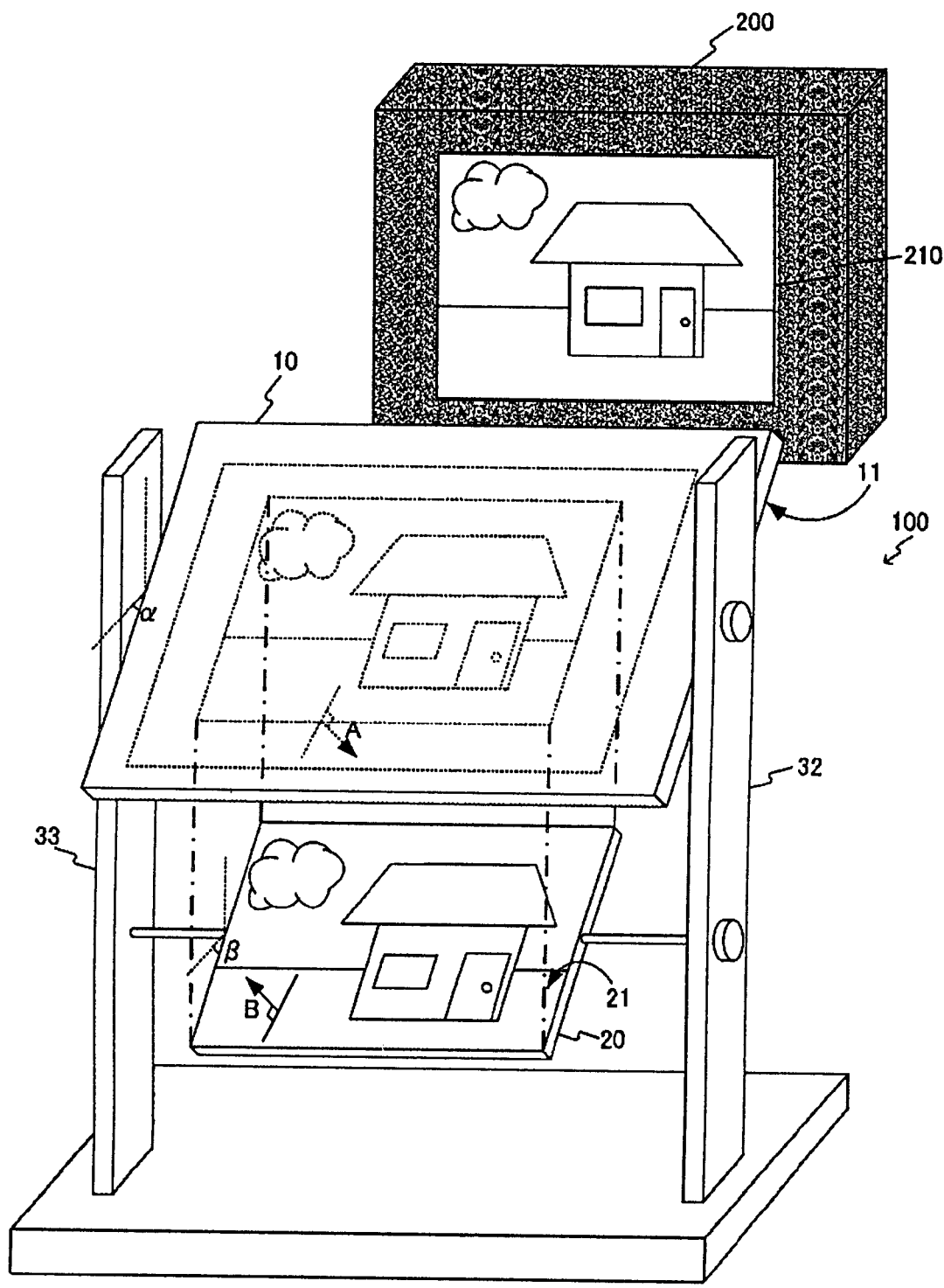
FIG. 2 is a perspective view showing an example of use of the image three-dimensional recognition apparatus.

FIG. 2 shows an example of use of the image three-dimensional recognition apparatus 100 of the embodiment of the present invention. As described above, the image three-dimensional recognition apparatus 100 is an apparatus for making it possible for an observer to recognize a planar image as a three-dimensional image. A television is an example of what displays a planar image (i.e., an image output device). Hereafter, an example that an observer recognizes a planar image displayed in a screen 210 of a television 200 as a three-dimensional image by using the image three-dimensional recognition apparatus 100 will be described.

In the example, the image three-dimensional recognition apparatus 100 is placed at a predetermined distance away from the television 200. In this state, the mirror plane 11 of the mirror 10 is directed toward the planar image displayed in the screen 210 of the television 200 (the back side of the paper) and is inclined obliquely downward (for instance, in the direction indicated by arrow A), as shown in FIG. 2. The whole of the television 200 is reflected in the mirror plane 11 of the mirror 10.

The mirror plane 21 of the mirror 20 is fixed at a position where a part or the whole of an image reflected in the mirror plane 11 of the mirror 10 is reflected in the mirror plane 21 of the mirror 20 (for instance, at a position directly below the mirror 10), as described above. Therefore, a part or the whole of the image reflected in the mirror plane 11 of the mirror 10 is reflected in the mirror plane 21 of the mirror 20. The observer can recognize the planar image displayed in the screen 210 of the television 200 as a three-dimensional image by seeing the mirror plane 21 of the mirror 20. The applicant of the present application saw the mirror plane 21 of the mirror 20 in the state shown in FIG. 2 as an observer. As a result of this, the applicant ascertained that an observer can recognize a three-dimensional image most clearly or most surely, when seeing an image displayed in the mirror plane 21 of the mirror 20 from a position located at approximately 60 cm to 70 cm away from the mirror plane 21 of the mirror 20.

Further, it is preferable that the image that is reflected in the mirror plate 21 of the mirror 20 and can be seen by the observer is only the image displayed in the screen 210 of the television 200. This is accomplished by adjusting the position where the image three-dimensional recognition apparatus 100 is to be placed, with consideration of the size of the screen 210 of the television 200, the distance between the television 200 and the image three-dimensional recognition apparatus 100, the size of the mirror plane 11 of the mirror 10, the size of the mirror plane 21 of the mirror 20, the angle α of the mirror plane 11 of the mirror 10 with respect to the support member 32 and the support member 33, the angle β of the mirror plane 21 of the mirror 20 with respect to the support member 32 and the support member 33, the angle at which the observer sees the mirror plane 21 of the mirror 20, the distance between the observer and the mirror plane 21 of the mirror 20 and so on.

FIG. 3 shows the widths of the mirror 10 and the mirror 20 in the horizontal direction and the positions of the mirror 10 and the mirror 20 of the image three-dimensional recognition apparatus 100. FIG. 3(a) shows the television 200, the mirror 10, the mirror 20 and the eyes of an observer 300, viewed from above, when the image three-dimensional recognition apparatus 100 is placed between the television 200 and the observer 300.

It is preferable that the image that is reflected in the mirror 20 of the image three-dimensional recognition apparatus 100 and can be seen by the observer 300 is only the image displayed in the screen 210 of the television 200. A way of limiting the image that is reflected in the mirror 20 of the image three-dimensional recognition apparatus 100 and can be seen by the observer 300 exiting at a particular distance away from the center of the front face of the television 200, to only the image displayed in the screen 210 of the television 200 will be explained below, by using the line 320 connecting between the right eye 302 of the observer 300 and the right edge of the screen 210 (hereafter, the line 320 is designated as right-eye-right-edge line 320), and the line 310 connecting between the left eye 301 of the observer 300 and the left edge of the screen 210 (hereafter, the line 310 is designated as left-eye-left-edge line 310).

The image three-dimensional recognition apparatus 100 needs to be placed between the television 200 and the observer 300. Further, the mirror 10 and the mirror 20 are positioned in such a manner that the sides of the mirror 10 and the mirror 20 extending in the horizontal direction is parallel to the sides of the screen 210 extending in the horizontal direction.

In this case, the mirror 20 needs to be positioned between the left-eye-left-edge line 310 and the right-eye-right-edge line 320. Namely, the width L of the mirror 20 in the horizontal direction needs to be smaller than the length L2 of the line that is parallel to the television 200 and is drawn from the left-eye-left-edge line 310 to the right-eye-right-edge line 320 at the position where the mirror 20 is located. Further, the width L of the mirror 20 needs to be greater than the distance L1 between the left eye 301 and the right eye 302 of the observer 300. The distance between the left eye and the right eye is approximately 6.5 centimeter in general. Furthermore, the mirror 10 needs to be greater than the mirror 20 in width in the horizontal direction.

By placing the image three-dimensional recognition apparatus 100 so as to satisfy these conditions, the image that is reflected in the mirror 20 of the image three-dimensional recognition apparatus 100 and can be seen by the observer 300 is limited to only the image displayed in the screen 210 of the television 200. For instance, in the case of setting the width L of the mirror 20 at a length close to L2, the image reflected in mirror 20 becomes the whole of the image displayed in the screen 210, as shown in FIG. 3(b). Further, in the case of setting the width L of the mirror 20 at, for instance, approximately ⅔ of L2, the image reflected in the mirror 20 becomes a part of the image displayed in the screen 210, as shown in FIG. 3(c).

Furthermore, if the width L of the mirror 20 is set at a length greater than L2, not only the image displayed in the screen 210 of the television 200 but also the sight around the television 200 is included in the image reflected in the mirror 20. This is not preferable because the presence or solidity (three-dimensional appearance) of the image reflected in the mirror 20, given to the observer 300, is reduced in many cases. Moreover, if the width L of the mirror 20 is set at a length smaller than L1, it becomes difficult for the observer 300 to see the image reflected in the mirror 20.

Figure 4:
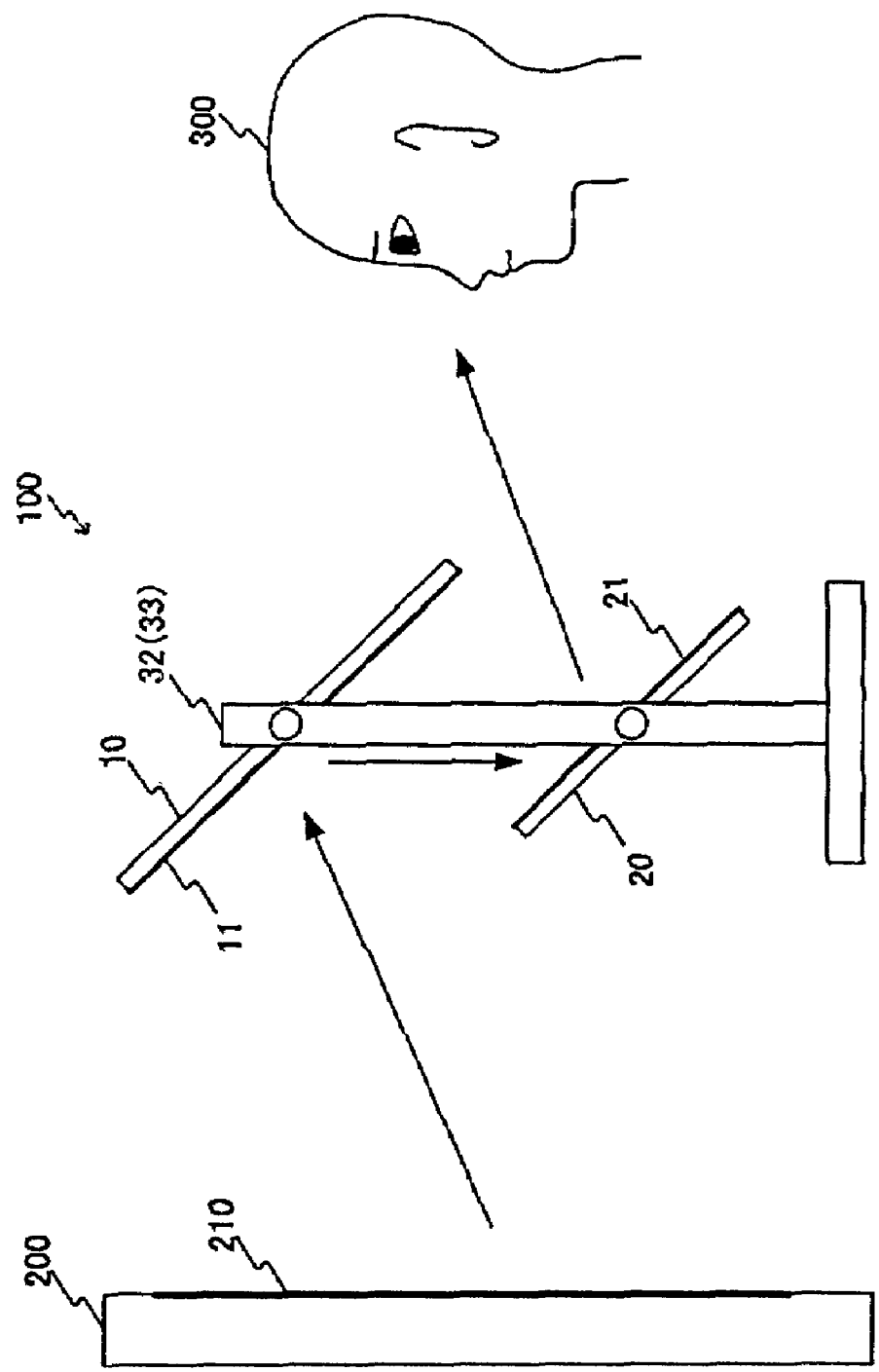
FIG. 4 is an explanatory diagram showing a positional relationship among the image three-dimensional recognition apparatus, a television and an observer.

FIG. 4 shows a positional relationship among the image three-dimensional recognition apparatus 100 of the embodiment of the preset invention, the television 200 and the observer 300. The image three-dimensional recognition apparatus 100 is placed at a particular distance away from the television 200. In this state, a planar image displayed in the screen 210 of the television 200 is reflected in the mirror plane 11 of the mirror 10 of the image three-dimensional recognition apparatus 100.

The image reflected in the mirror plane 11 of the mirror 10 is then reflected in the mirror plane 21 of the mirror 20. The observer 300 can recognize the image reflected in the mirror plane 21 of the mirror 20 as a three-dimensional image by seeing the image in the mirror plane 21 of the mirror 20 from a position a particular distance away from the mirror plane 21 of the mirror 20. It is preferable to set the particular distance between the mirror plane 21 of the mirror 20 and the observer 300 at approximately 60 cm to 70 cm, as described above.

Figure 5:
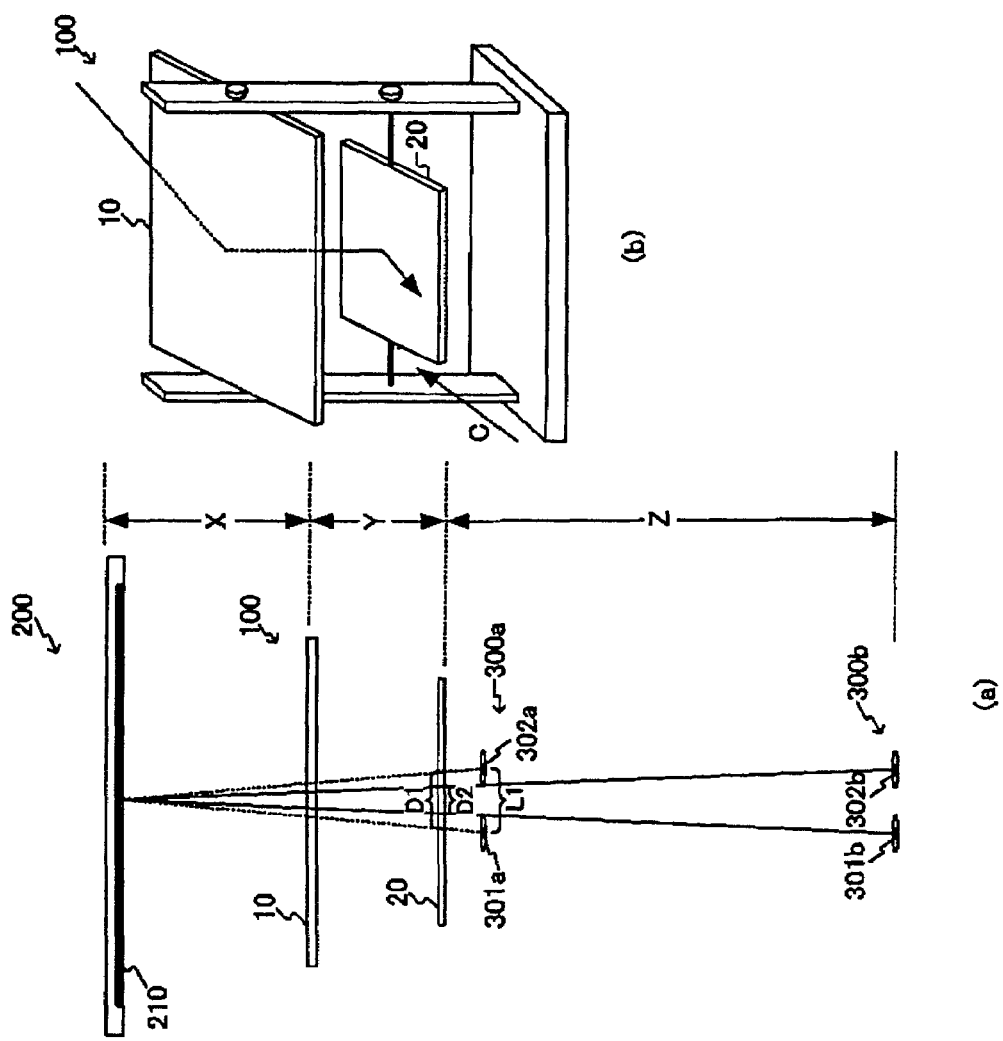
FIG. 5 is an explanatory diagram showing a reason why a planar image displayed in a screen of the television appears a three-dimensional image through the image three-dimensional recognition apparatus.

FIG. 5 shows the reason why a planar image displayed in the screen 210 of the television 200 appears a three-dimensional image through the image three-dimensional recognition apparatus 100. FIG. 5(a) schematically shows the television 200, the mirror 10, the mirror 20, and the eyes of the observer 300b (300a) when the image three-dimensional recognition apparatus 100 is placed between the television 200 and the observer 300b (300a).

In FIG. 5(a), an area X is the area from the television 200 to the mirror 10 of the image three-dimensional recognition apparatus 100. An area Y is the area from the mirror 10 to the mirror 20. An area Z is the area from the mirror 20 to the observer 300b.

In FIG. 5(a), the positional relationship between the television 200 and the mirror 10 in the area X corresponds to the positional relationship between the television 200 and the mirror 10 when viewing the television 200 from above. The positional relationship between the mirror 10 and the mirror 20 in the area Y corresponds to the positional relationship between the mirror 10 and the mirror 20 when viewing the image three-dimensional recognition apparatus 100 along the direction indicated by arrow C. The positional relationship between the mirror 20 and the observer 300b in the area Z corresponds to the positional relationship between the mirror 20 and the observer 300b when viewing the observer 300b from above.

For ease of understanding, FIG. 5(a) schematically shows as if light travels straightly between the television 200 and the observer 300a or 300b in the direction parallel to the line of sight of the observer 300a or 300b, however in actuality, the traveling direction of the light from the mirror 10 to the mirror 20 in the area Y is not parallel to the line of sight of the observer 300a or the observer 300b. To schematically show the traveling route of light between the television 200 and the observer 300a or 300b as a straight line, the positional relationship between the mirror 10 and the mirror 20 when viewing the image three-dimensional recognition apparatus 100 along the direction indicated by arrow C shown in FIG. 5(b) is depicted in FIG. 5(a).

Now, attention is focused on the observer 300a. The observer 300a exists very near the mirror 20. In this case, the observer 300a cannot recognize the image reflected in the mirror 20 as a three-dimensional image by seeing the mirror 20. This is because the difference between the distance L1 between both eyes of the observer 300a and the width D1 of the range of the sight of the observer 300a at the position of the mirror 20 is small.

Next, attention is focused on the observer 300b. The observer 300b exists at a particular distance away from the mirror 20. In this case, the observer 300b can recognize the image reflected in the mirror 20 as a three-dimensional image by seeing the mirror 20. This is because the difference between the distance L1 between both eyes of the observer 300b and the width D2 of the range of the sight of the observer 300b at the position of the mirror 20 is large.

If the distance between the observer 300b and the mirror 20 is made longer, the width D2 of the range of the sight of the observer 300b becomes shorter. As the width D2 of the range of the sight of the observer 300b becomes shorter, the line of sight of the right eye and the line of sight of the left eye of the observer 300b come closer to each other at the position of the mirror 20, and this produces the state almost the same as seeing the image with one eye. The fact that a planar image appears a three-dimensional image by seeing with one eye has been already known well. This is a reason why it is possible for an observer to recognize a planar image displayed in the screen 210 of the television 200 as a three-dimensional image by using the image three-dimensional recognition apparatus 100.

Figure 6:
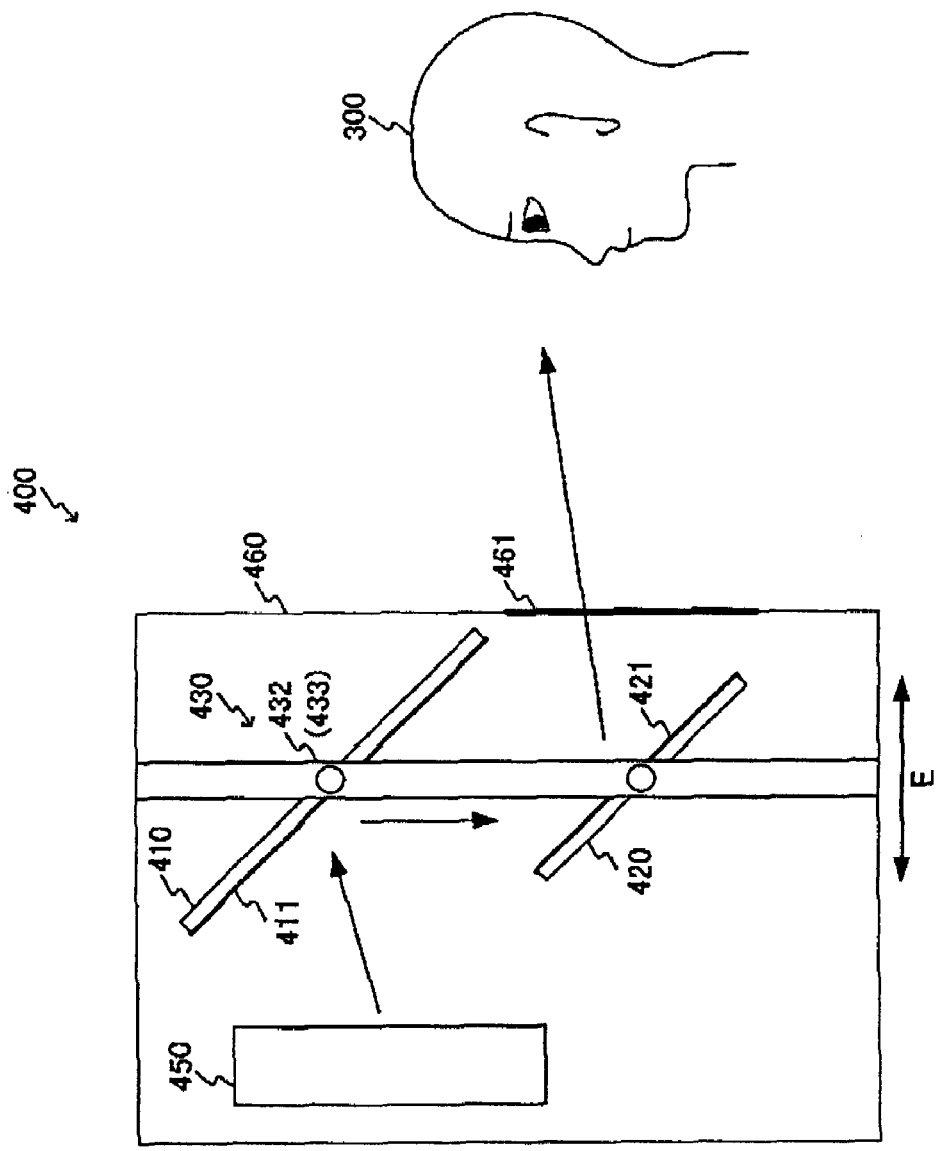
FIG. 6 is a perspective view showing an image three-dimensional recognition apparatus of another embodiment of the present invention.

FIG. 6 shows an image three-dimensional recognition apparatus 400, which is another embodiment of the present invention. The image three-dimensional recognition apparatus 400 is an apparatus for making it possible for an observer to recognize a planar image as a three-dimensional image, similarly to the image three-dimensional recognition apparatus 100. The image three-dimensional recognition apparatus 400 is basically made by integrating the image three-dimensional recognition apparatus 100 with a device for displaying an image such as a television etc.

The image three-dimensional recognition apparatus 400 has a mirror 410, a mirror 420, a mirror fixing part 430, an image output part 450 and a case 460. The mirror 410 and the mirror 420 have almost the same functions as those of the mirror 10 and the mirror 20 described above, and therefore, the explanation of the mirror 410 and the mirror 420 is omitted.

The mirror fixing part 430 has almost the same function as that of the mirror fixing part 30 of the image three-dimensional recognition apparatus 100, however is different from the mirror fixing part 30 in constitution. The mirror fixing part 430 has a support member 432 and a support member 433. The case 460 corresponds to the base 31 of the mirror fixing part 30.

The support member 432 and the support member 433 are attached to the case 460 at their end part, respectively. A slide mechanism may be arranged in the case 460 in order to make it possible to slide the support member 432 and the support member 433 in the direction indicated by arrow E shown in FIG. 6. By the slide mechanism, the distance between the image output part 450 and the support member 432 (the mirror 410) and the distance between the image displaying part 450 and the support member 433 (the mirror 420) can be changed.

Further, the relationship among the mirror 410, the mirror 420 and the mirror fixing part 430 is almost the same as the relationship among the mirror 10, the mirror 20 and the mirror fixing part 30 of the image three-dimensional recognition apparatus 100, which is described above. Therefore, explanation of this point is omitted.

The image output part 450 is a device for displaying an image, and is installed in the case 460. The image output part 450 is, for instance, a television, however, is not limited to this, and namely, includes various devices capable of displaying a moving image or a still image. Further, the position where the image output part 450 is arranged needs to be a position where an image displayed in the image output part 450 is reflected in a mirror plane 411 of the mirror 410.

The image displayed in the image output part 450 is reflected in the mirror plane 411 of the mirror 410. The image reflected in the mirror plane 411 of the mirror 410 is reflected in a mirror plane 421 of the mirror 420. A transparent screen part 461 attached to the case 460 is located in front of the mirror plane 421 of the mirror 420. The observer 300 can see the mirror plane 421 of the mirror 420 through the transparent screen part 461 attached to the case 460. The observer 300 can see a three-dimensional image by seeing the screen part 461.

As described above, according to the image three-dimensional recognition apparatus 100 of one embodiment of the present invention, an observer can recognize a planar image as a three-dimensional image by seeing the mirror 20 of the image three-dimensional recognition apparatus 100 placed in front of a device for displaying a planar image. Further, according to the image three-dimensional recognition apparatus 400 of another embodiment of the present invention, an observer can recognize a planar image provided by a device for displaying an image installed in the image three-dimensional recognition apparatus 400, as a three-dimensional image.

The present invention produces stereopsis through both eyes with respect to an image with only the monocular stereopsis factors. Therefore, it is preferably to eliminate binocular parallax factors, which are binocular steropsis factors, as many as possible. To accomplish this, the applicant of the present application conceived the following two ideas in the present invention. Firstly, the imaginary distance between both eyes is shortened by setting the position of the observer at a particular distance away from the mirror 20, and the vision similar to the monocular vision is produced so that the binocular parallax factors are reduced. Secondly, the field of vision is restricted to the image output part, such as a monitor screen (i.e., the image included in the field of vision is restricted to an image with only the monocular stereopsis factors), by limiting the sizes of the mirrors 20, 10 and the positional relationship among the mirror 10, the mirror 20 and the image output part. Therefore, the field of vision having a small amount of the binocular parallax factors is obtained through both eyes.

Incidentally, an observer can obtain a sense of recognizing a planar image as a three-dimensional image without using the image three-dimensional recognition apparatus 100 or the image three-dimensional recognition apparatus 400 after the observer continued seeing a three-dimensional image during a particular period by using the image three-dimensional recognition apparatus 100 or the image three-dimensional recognition apparatus 400.

Furthermore, for instance, the present invention can be used for showing an image displayed in a television to an observer as a three-dimensional image.

The present embodiments are mere examples for embodying the invention. The invention is not limited to the present embodiments. The invention may be embodied in other specific forms without departing from the spirit or essential characteristics thereof.

What is claimed is:

1. An image three-dimensional recognition apparatus for making it possible for an observer existing at a particular distance away from the image three-dimensional recognition apparatus to recognize a planar image displayed in an image output device for displaying an image, as a three-dimensional image, comprising:
    a first mirror that has a width in a horizontal direction of not less than approximately 6.5 centimeter and not more than a distance from a right-eye-right-edge line connecting between a right eye of the observer and a right edge of the image output device to a left-eye-left-edge line connecting between a left eye of the observer and a left edge of the image output device;
    a second mirror that has a width in the horizontal direction of not less than the width in the horizontal direction of the first mirror; and
    a mirror fixing part for fixing the first mirror and the second mirror,
    wherein the second mirror is fixed to the mirror fixing part in such a manner that a second mirror plane, which is a mirror plane of the second mirror, is directed toward the planar image and is inclined obliquely downward, and
    the first mirror is fixed to the mirror fixing part in such a manner that a part or the whole of an image reflected in the second mirror plane is reflected in a first mirror plane, which is a mirror plane of the first mirror, and the first mirror plane is inclined obliquely upward.

2. The image three-dimensional recognition apparatus according to claim 1, wherein the mirror fixing part has:
    a base; and
    two support members arranged on the base, and
    the first mirror and the second mirror are fixed to the support members by attaching both of side faces of the first mirror and the second mirror to the support members.

3. The image three-dimensional recognition apparatus according to claim 1, further comprising a first angle changing part for changing an angle at which the first mirror plane is inclined obliquely downward.

4. The image three-dimensional recognition apparatus according to claim 1, further comprising a second angle changing part for changing an angle at which the second mirror plane is inclined obliquely upward.

5. The image three-dimensional recognition apparatus according to claim 1, wherein the first mirror is placed at a distance of 60 cm or more from the observer.

6. The image three-dimensional recognition apparatus according to claim 1, further comprising:
    a case for installing the first mirror, the second mirror and the mirror fixing part therein; and
    a screen part attached to the case and located in front of the first mirror such that the observer can see the first mirror through the screen part.

7. An image three-dimensional recognition apparatus for making it possible for an observer existing at a particular distance away from the image three-dimensional recognition apparatus to recognize a planar image as a three-dimensional image, comprising:
    an image output part for displaying an image;
    a first mirror that has a width in a horizontal direction of not less than approximately 6.5 centimeter and not more than a distance from a right-eye-right-edge line connecting between a right eye of the observer and a right edge of the image output part to a left-eye-left-edge line connecting between a left eye of the observer and a left edge of the image output part;
    a second mirror that has a width in the horizontal direction of not less than the width in the horizontal direction of the first mirror; and
    a mirror fixing part for fixing the first mirror and the second mirror,
    wherein the second mirror is fixed to the mirror fixing part in such a manner that a second mirror plane, which is a mirror plane of the second mirror, is directed toward the planar image and is inclined obliquely downward, and the first mirror is fixed to the mirror fixing part in such a manner that a part or the whole of an image reflected in the second mirror plane is reflected in a first mirror plane, which is a mirror plane of the first mirror, and the first mirror plane is inclined obliquely upward.

8. An apparatus that permits an observer, at a specified distance from the apparatus, to perceive a planar image displayed by an image output device as a three-dimensional image, comprising:
- a first mirror having a width of between approximately 6.5 centimeters and a distance between (i) a right-eye-right-edge line extending between a right eye of the observer and a right edge of the image output device and (ii) a left-eye-left-edge line extending between a left eye of the observer and a left edge of the image output device;
- a second mirror having a width at least equal to the width of the first mirror; and
- a mirror holder that holds the first mirror and the second mirror relative to the image output device and the observer, the second mirror being held so that a mirror plane of the second mirror is directed toward the planar image and is inclined obliquely downward, the first mirror plane being held so that it is inclined obliquely upward, and
- wherein the first mirror, because it is within an area between the right-eye-right-edge line and the left-eye-left-edge line, reflects only a part or a whole of an image displayed by the image output device and reflected in the mirror plane of the second mirror.

* * * * *